United States Patent
Atias et al.

(10) Patent No.: US 7,243,251 B2
(45) Date of Patent: Jul. 10, 2007

(54) METHOD AND APPARATUS FOR NOTIFYING END USER OF EXCESS POWER DEMAND

(75) Inventors: Ilan Atias, Haifa (IL); David Pincu, Holon (IL); Simon Kahn, Jerusalem (IL)

(73) Assignee: PowerDsine, Ltd. - Microsemi Corporation, Hod Hasharon (IL)

( * ) Notice: Subject to any disclaimer, the term of this patent is extended or adjusted under 35 U.S.C. 154(b) by 670 days.

(21) Appl. No.: 10/726,547

(22) Filed: Dec. 4, 2003

(65) Prior Publication Data

US 2005/0125507 A1    Jun. 9, 2005

(51) Int. Cl.
*G06F 1/26* (2006.01)
*G06F 1/30* (2006.01)
*G06F 1/32* (2006.01)
*G06F 11/30* (2006.01)

(52) U.S. Cl. .............. 713/324; 713/300; 713/320; 713/323; 714/14; 714/22; 714/36

(58) Field of Classification Search ............. 713/340
See application file for complete search history.

(56) References Cited

U.S. PATENT DOCUMENTS

| | | | |
|---|---|---|---|
| 5,652,893 A | 7/1997 | Ben-Meir et al. ........ 395/750 |
| 6,115,468 A | 9/2000 | De Nicolo ................ 379/413 |
| 6,218,930 B1 * | 4/2001 | Katzenberg et al. ...... 370/200 |
| 6,392,695 B1 * | 5/2002 | Watamoto et al. ........ 348/173 |
| 6,473,608 B1 | 10/2002 | Lehr et al. ............... 455/402 |
| 6,643,566 B1 | 11/2003 | Lehr et al. ............... 700/286 |
| 2003/0072438 A1 | 4/2003 | Le Creff ................ 379/399.01 |

FOREIGN PATENT DOCUMENTS

EP       1303078 A1       4/2003

OTHER PUBLICATIONS

ISR for PCT equiv.
Writtent Opinion for PCT equivalent.

* cited by examiner

*Primary Examiner*—James K. Trujillo
(74) *Attorney, Agent, or Firm*—Simon Kahn

(57) ABSTRACT

A method and apparatus for notifying an end user of a powered device on an Ethernet based network that the powered device will not be reliably powered due to an excess demand condition comprising: detecting an attached powered device; identifying the class of the attached powered device, the class comprising the power requirements of the attached powered device; identifying an excess demand condition; and temporarily supplying power to the attached powered device for a time interval thereby notifying an end user that the powered device is not being reliably powered because of an excess demand condition.

44 Claims, 12 Drawing Sheets

Fig. 4

500 — Additional Power becomes Available

510 — Run Newly Connected PD Method on Units in PD Queue

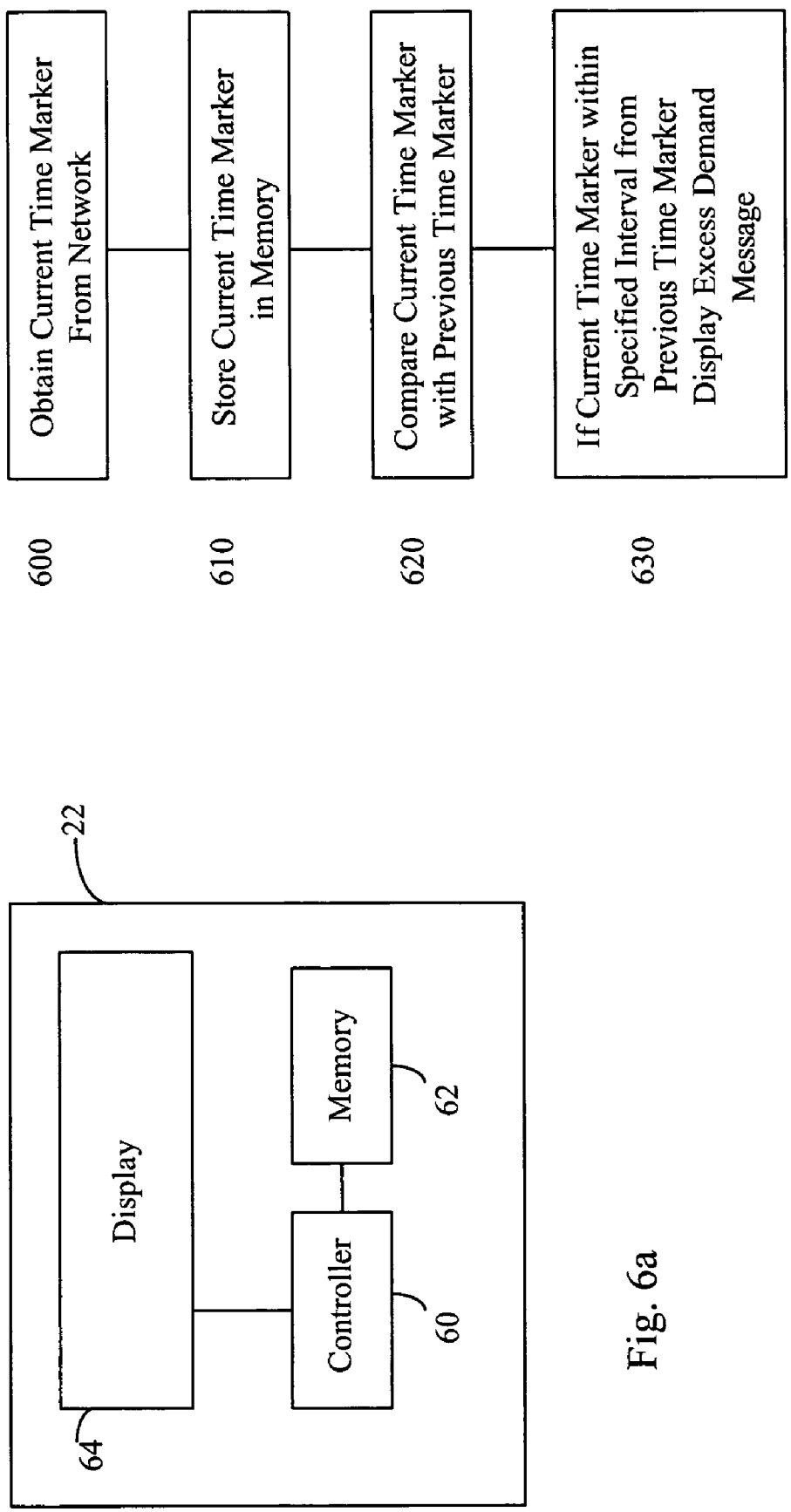

METHOD AND APPARATUS FOR NOTIFYING END USER OF EXCESS POWER DEMAND

BACKGROUND OF THE INVENTION

The invention relates generally to the field of power over local area networks, particularly Ethernet based networks, and more particularly to a method of notifying a user of a powered device of an excess power demand condition.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power back-up; and centralized security and management.

Several patents addressed to this issue exist including U.S. Pat. No. 6,473,608 issued to Lehr et al., whose contents are incorporated herein by reference, U.S. Pat. No. 6,643,566 issued to Lehr et al., whose contents are incorporated herein by reference, and U.S. Pat. No. 6,115,468 issued to De Nicolo whose contents are incorporated herein by reference. Furthermore a standard addressed to the issue of powering remote devices over an Ethernet based network has been published as IEEE 802.3af-2003, whose contents are incorporated herein by reference.

A basic issue in remote powering of devices is the need for the power sourcing equipment (PSE) to have sufficient power to operate each powered device (PD) attached to the network. A further issue, as a result, is the necessity of prioritizing power allocation in the event that multiple PDs are connected having power demands in excess of the power sourcing ability of the PSE. In such a circumstance certain PDs will not receive power, however no recommendation in the above mentioned IEEE 802.3al-2003 standard is addressed to notifying the PD, or the user at the remote location, of the excess demand condition. Such a situation may lead to confusion, as the user plugging in the device, which in one embodiment is an Internet protocol (IP) telephone, is unaware of the excess demand condition and may assume that the device is faulty. This leads to unnecessary service calls, and general dissatisfaction with the operation of the network and its associated devices.

U.S. patent application Ser. No. 10/253,800 by LeCreffet al., published as US 2003/0072438 and EP 1,303,078 proposes that when the Ethernet equipment will be unable to supply the required power to the equipment, the Ethernet equipment will send via the line a specific signal notifying the equipment of the incapacity to be remotely powered. Such a device assumes that the PD can operate at some limited functionality in the absence of power from the PSE to notify the user of the alarm signal. Such a requirement increases the cost of the PD. Furthermore, if the initial alarm notification is unnoticed by the user, no mechanism exists to notify the user on a continuing basis of the excess demand condition.

It would therefore be desirable to have an apparatus for, and a method of, notifying an end user at a remote PD of an excess demand condition. Preferably, the notification is operable in the absence of any other power source for the PD. It would also be desirable to have an apparatus for, and a method of, periodically notifying the end user of the excess demand condition

SUMMARY OF THE INVENTION

Accordingly, it is a principal object of the present invention to overcome the disadvantages of prior art remote PD powering in an excess demand condition. This is provided in the present invention by an apparatus for, and a method of, temporarily powering the powered device for a time interval after being connected. This provides feedback to the end user of the proper operation of the PD.

In particular the invention provides for a method for notifying an end user of a powered device on an Ethernet based network that the powered device will not be powered due to an excess demand condition comprising: detecting an attached powered device; identifying an excess demand condition; and temporarily supplying power to the attached powered device for a first time interval, thereby notifying an end user that the powered device is not being powered because of an excess demand condition.

In one preferred embodiment the powered device is a IEEE 802.3 compliant device. In another preferred embodiment the detecting is accomplished over a connection selected from among 10BaseT, 100BaseT and 1000BaseT. In yet another preferred embodiment the temporarily supplying of power is accomplished by an Ethernet switch or a Midspan device.

In one embodiment the invention further comprises identifying the class of the attached powered device, the class comprising the power requirements of the attached powered device. In one further embodiment the invention comprises storing an identifier of the detected attached powered device associated with the class of the powered device in a queue, the queue comprising identifiers for all attached powered devices not being powered. In another embodiment the invention further comprises signaling the attached powered device of the excess demand condition. In a further embodiment the invention comprises displaying on the attached powered device a message indicative of the excess demand condition.

In one embodiment the first time interval is between 10 seconds and 2 minutes and in another embodiment the first time interval is between 30 seconds and 1 minute. In yet another embodiment the first time interval is a function of the number of identifiers in the queue.

In one exemplary embodiment the invention further comprises storing an identifier of the detected attached powered device in a queue comprising identifiers of all attached powered devices not being reliably powered. In a further exemplary embodiment the invention comprises alternatingly powering each of the attached powered devices in the queue for a second time interval. In one further embodiment the second time interval is substantially the same as the first time interval. In one embodiment the second time interval is between 10 seconds and 2 minutes, and in another embodiment the second time interval is between 30 seconds and 1 minute.

In yet another embodiment the first time interval or the second first time interval is a function of the number of identifiers in the queue. In another embodiment the first time interval or the second first time interval is a function of the power requirements identified by the identifiers and associated classes in the queue. In a still further exemplary embodiment the invention further comprises signaling the attached powered device of the temporary nature of the power on condition. In a yet still further exemplary embodiment the invention comprises displaying on the attached powered device a message indicative of the excess demand condition.

In one exemplary embodiment the invention further comprises storing an identifier of the detected attached powered device in a queue comprising identifiers of all attached powered devices not being powered; detecting an additional power condition; powering at least one attached powered device identified in the queue; and removing the identifier of the attached powered device now being powered from the queue. In a further embodiment the invention comprises temporarily supplying power to at least one attached powered device remaining in the queue for the first time interval thereby notifying an end user that the powered device is not being powered because of the excess demand condition.

The invention also provides for an apparatus for notifying an end user of a powered device on an Ethernet based network of that the powered device will not be reliably powered due to an excess demand condition, the apparatus comprising: a powered device detector for detecting an attached powered device; an excess demand identifier associated with the powered device detector for identifying an excess demand condition; a timer for tiring a first time interval; a power enabler associated with the excess demand identifier and the timer for temporarily supplying power to the detected attached powered device for the first time interval thereby notifying an end user that the powered device is not being powered because of the excess demand condition.

In one preferred embodiment the powered device is an IEEE 802.3 compliant device. In another preferred embodiment the powered device detector is connected to the powered device over a connection selected from among 10BaseT, 100BaseT and 1000BaseT. In another preferred embodiment the power enabler is located in an Ethernet switch or a Midspan device.

In another embodiment the invention further comprises a powered device class identifier for identifying the class of the powered device, the class comprising the power requirements of the powered device. In a further embodiment the invention further comprises a storer associated with the power enabler and a queue associated with the storer, the storer storing an identifier of the detected attached powered device associated with the class of the attached powered device in the queue, the queue thus comprising an identifier of all powered attached device not being powered.

In yet another embodiment the invention further comprises signaling means associated with the power enabler for signaling the attached powered device of the excess demand condition. In a further embodiment the invention comprises a display connected to the powered device for displaying a message indicative of the excess demand condition.

In one embodiment the invention further comprises a storer associated with the power enabler and a queue associated with the storer, the storer storing an identifier of the detected attached powered device in the queue, and the queue thus comprising an identifier of all powered attached device not being powered. In a further embodiment the invention comprises an alternator associated with the power enabler the timer and the queue, wherein the timer times a second time interval, and the alternator alternatingly powers each of the attached powered device in the queue for the second time interval. In a yet further embodiment the invention comprises signaling means associated with the power enabler, for signaling the attached powered device of the excess demand condition. In a yet further embodiment the invention comprises a display associated with the powered device for displaying a message indicative of the excess demand condition.

In one embodiment the second time interval is substantially the same as the first time interval. In another embodiment the first time interval is between 10 seconds and 2 minutes. In yet another embodiment the first time interval is between 30 seconds and 1 minute. In another embodiment the second time interval is between 10 seconds and 2 minutes, and in yet another embodiment the second time interval is between 30 seconds and 1 minute. In yet another embodiment the first time interval is a function of the number of identifiers of unpowered units in the queue. In yet another embodiment the second time interval is a function of the number of identifiers of unpowered units in the queue. In yet another embodiment, the first or the second time interval is a function of the total power demand of the PD units in the queue as indicated by the identifiers and their associated class.

In an exemplary embodiment the invention further comprises a power condition detector for detecting an additional power condition and a remover for removing the identification of at least one attached powered device for which power is now available from the queue.

The invention also provides for a powered device adapted to sense an excess demand condition comprising: a controller; a display associated with the controller; and a non-volatile memory associated with the controller, whereby the controller compares a current time marker with a previous time marker stored on the non-volatile memory, and in the event the difference between the current time marker and the stored previous time marker are less than a specified time interval displays a message indicating an excess demand condition on the display.

In one embodiment the powered device is a IEEE 802.3 compliant device. In another embodiment the powered device comprises an Internet Protocol (IP) telephone, an IP camera, a laptop computer or other portable computing device, a desktop computer, a door controller, a cellular base station or a wireless access control.

The invention also provides for a method for detecting an excess demand condition in a powered device, comprising: obtaining a current time marker; comparing the current time marker with a previously stored time marker, thereby obtaining a time difference; and in the event that the time difference is less than a specified time interval displaying an excess demand condition message.

The invention also provides for a method for detecting an excess demand condition in a powered device, comprising: obtaining a current time marker; retrieving a last two previously stored time markers; comparing the last two previously stored time markers to obtain a first time difference; comparing the last of the last two previously stored time markers to the current time marker to obtain a second time difference; and in the event that the first time difference is less than a first specified time interval, and the second time difference is less than a second specified time interval displaying an excess demand condition message.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 4 illustrates a high level flow chart of a preferred operation when increased power becomes available according to the principle of the invention;

FIG. 6a illustrates a high level block diagram of an embodiment of a powered device according to the principle of the invention;

FIG. 6b illustrates a high level flow chart of a first embodiment of a method of the powered device of FIG. 6a upon power-up according to the principle of the invention.

DETAILED DESCRIPTION OF THE PREFERRED EMBODIMENTS

Figure 1A:
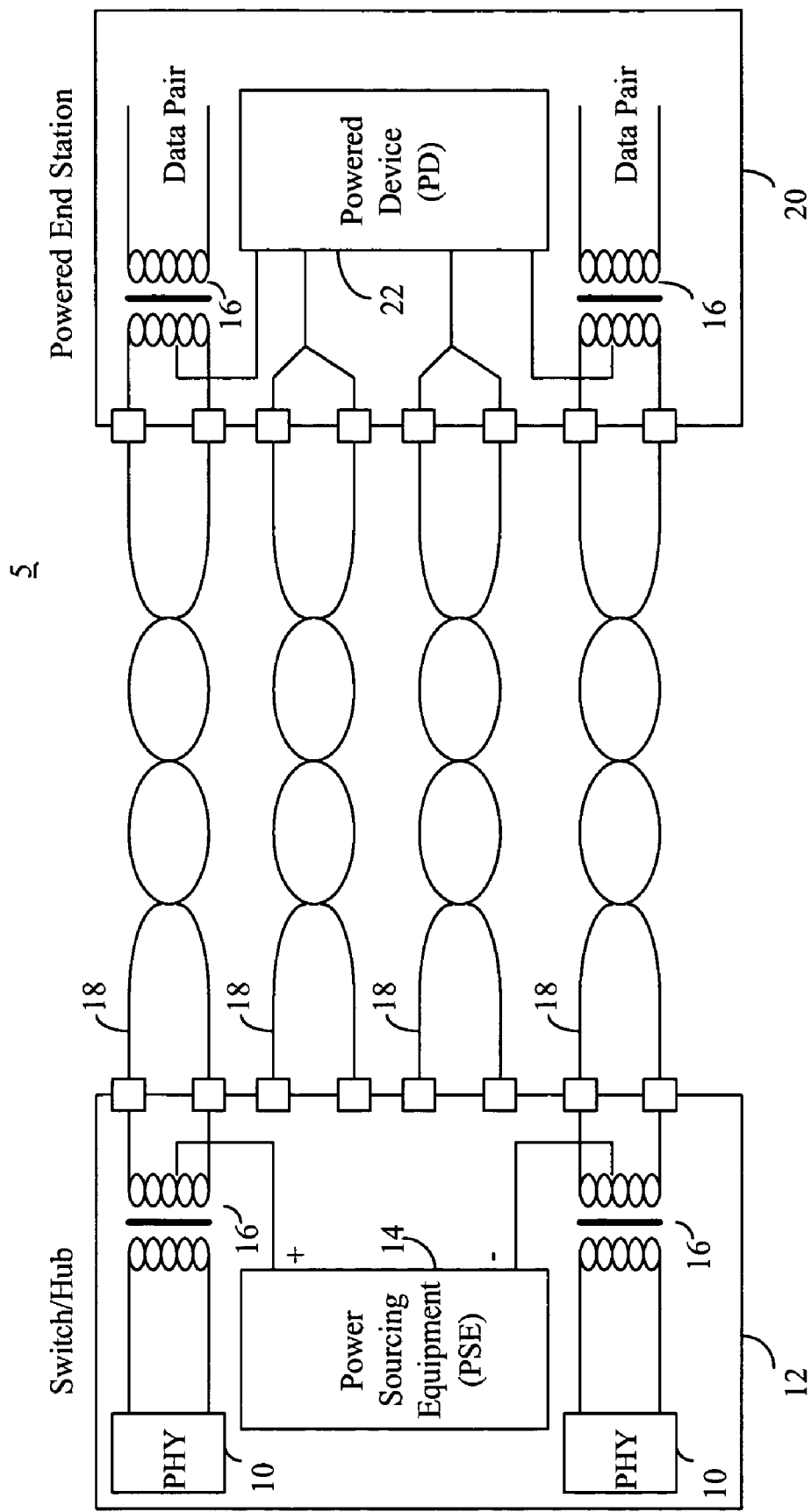
FIG. 1a illustrates a high level block diagram of a first alternative network configuration for remote powering from an endpoint PSE known to the prior art.

The present embodiments enable a method of, and an apparatus for, temporarily supplying power to a powered device (PD) for which insufficient power is available due to an excess demand condition. This provides feedback to the end user of the proper operation of the PD. In a first preferred embodiment the operation is repeated for each incidence of a PD connection detected by the power supply equipment (PSE). In a second preferred embodiment, an identification of each unit for which an excess demand condition exists is placed in a queue, and the units in the queue are alternatingly powered for a predetermined time period.

The invention also provides for a powered device comprising a controller, a non-volatile memory and a display. The controller stores the time of power-up received from the network, and compares it to previous power-up times stored in the non-volatile memory. When a periodic powering-up is detected at intervals shorter than a predetermined time, the controller displays a low network power message on the display.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention is being described as an Ethernet based network, with a powered device being connected thereto, however this is not meant to be limiting in any way. The invention is equally applicable to other local area networks for which power is supplied to devices or nodes from at least one central power source, and for which available power to be supplied is limited, and on occasion is insufficient to supply the needs of all devices or nodes requiring power from the central power source. It is to be understood that the powered device is preferably an IEEE 802.3 compliant device preferably employing a 10 BaseT, 100 BaseT or 1000 BaseT connection. In one embodiment, the apparatus powering the powered device is located in an Ethernet switch, while in a second preferred embodiment the apparatus powering the powered device is located in a midspan device.

In an exemplary embodiment the powered device comprises an Internet Protocol (IP) telephone, an IP camera, a laptop computer or other portable computing device, a desktop computer, a door controller, a cellular base station or a wireless access control.

FIG. 1a illustrates a high level block diagram of a first alternative network configuration 5 for remote powering from an endpoint PSE known to the prior art. Network configuration 5 comprises: switch/hub equipment 12 comprising physical layer (PHY) controller 10, PSE 14 and first and second transformers 16; first, second, third and fourth twisted pair connections 18; and powered end station 20 comprising PD 22 and third and fourth transformers 16. PSE 14 located in switch/hub equipment 12, is connected to the center tap of the secondary of first and second transformers 16. The primary of first and second transformers 16 are each connected to communication devices typically through PHY 10, and the secondary of first and second transformer 16 are each connected to a first end of first and second twisted pair connections 18, respectively. The second end of each of first and second twisted pair connection 18 is connected to the primary of third and fourth transformer 16 located within powered end station 20, respectively. The center tap of the primary of first and second transformer 16, located within powered end station 20, is connected to powered device (PD) 22. In a preferred embodiment, first and second transformers 16 are part of PSE 14, and third and fourth transformers 16 are part of PD 22.

In operation, PSE 14 supplies power over first and second twisted pair connection 18, thus supplying both power and data simultaneously over the same twisted pair connections 18 to PD 22, with first twisted pair connection 18 being connected via the center tap secondary of first transformer 16 to the positive lead of PSE 14 and second twisted pair connection 18 being connected via the center tap secondary of second transformer 16 to the negative lead of PSE 14. Third and fourth twisted pair connections 18 are not utilized, and are thus available as spare connections. Third and fourth twisted pair connections 18 are shown connected to PD 22 in order to allow operation alternatively in a manner that will be described further hereinto below in relation to FIG. 1b over unused third and fourth twisted pair connections 18. PD 22 is operatively connected to the positive lead of PSE 14 through first twisted pair connection 18 and the center tapped primary of first transformer 16 located in powered end station 20 and is operatively connected to the negative bead of PSE 14 through second twisted pair connection 18 and the center tapped primary of second transformer 16 located in powered end station 20.

Figure 1B:
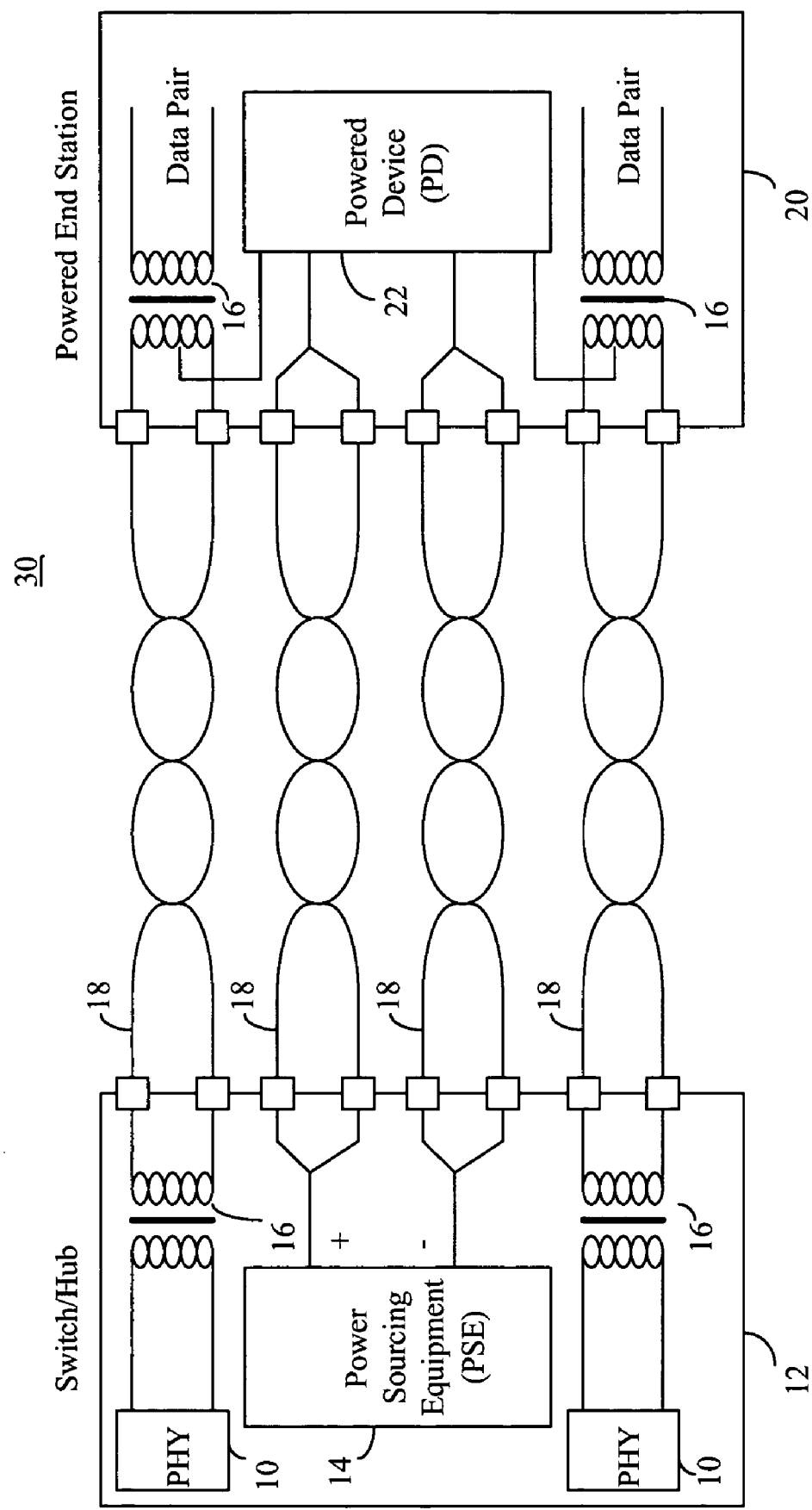
FIG. 1b illustrates a high level block diagram of a second alternative network configuration for remote powering from an endpoint PSE known to the prior art.

FIG. 1b illustrates a high level block diagram of a second alternative network configuration 30 for remote powering from an endpoint PSE known to the prior art. Network configuration 30 comprises: switch/hub equipment 12 comprising PHY 10, PSE 14 and first and second transformers 16; first, second, third and fourth twisted pair connections 18; and powered end station 20 comprising PD 22 and third and fourth transformers 16. The primary of first and second transformers 16 are each connected to communication devices typically through PHY 10, and the secondary of first and second transformers 16 are each connected to a first end of first and second twisted pair connections 18, respectively. PSE 14 located in switch/hub equipment 12, is connected to third and fourth twisted pair connection 18. The second end of each of first and second twisted pair connections 18 is connected to the primary of third and fourth transformer 16, respectively, located within powered end station 20, respectively. The center tap of the primary of third and fourth transformer 16, located within powered end station 20, is connected to PD 22. The second end of each of third and fourth twisted pair connection 18 is connected to the power input of PD 22. In a preferred embodiment, first and second transformers 16 are part of PSE 14, and third and fourth transformers 16 are part of PD 22.

In operation PSE 14 supplies power to PD 22 over third and fourth twisted pair connection 18, with data being supplied over first and second twisted pair connection 18. Power and data are thus supplied over separate twisted pair connections, and are not supplied over a single twisted pair connection. The center tap connection of third and fourth transformer 16 is not utilized, but is shown connected in order to allow operation alternatively as described above in relation to FIG. 1a. The configurations of FIG. 1a and FIG. 1b thus allow for powering of PD 22 either over the same twisted pair connections 18 as data, or over spare twisted pair connections 18.

Figure 1C:
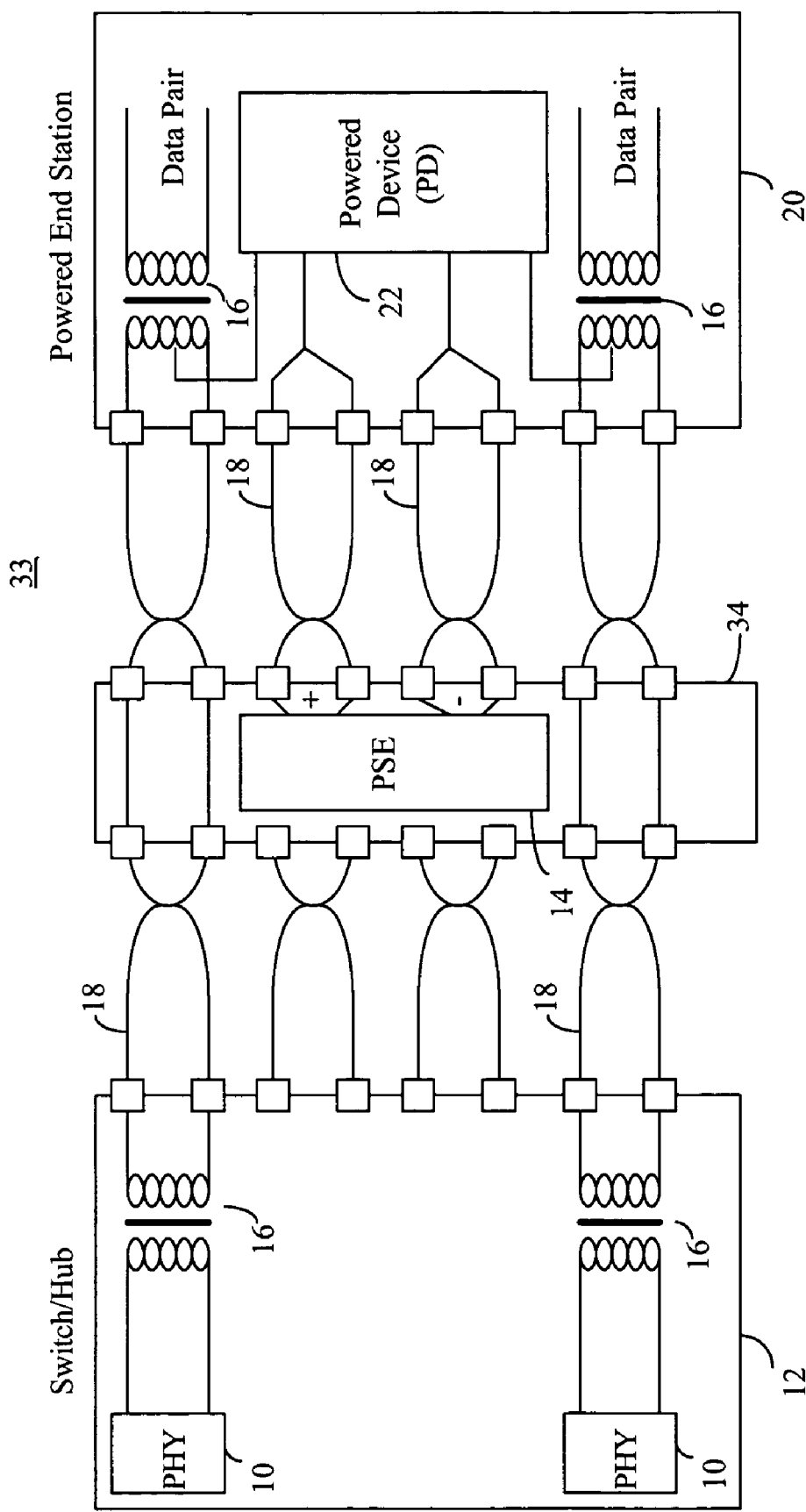
FIG. 1c illustrates a high level block diagram of an alternative network configuration for remote powering from a midspan PSE known to the prior art.

FIG. 1c illustrates a high level block diagram of an alternative network configuration 33 for remote powering from an midspan PSE known to the prior art. Network configuration 33 comprises: switch/hub equipment 12 comprising PHY 10 and first and second transformers 16; first, second third and fourth twisted pair connections 18; powered end station 20 comprising PD 22 and third and fourth transformers 16; and midspan power insertion equipment 34 comprising PSE 14. The primary of first and second transformers 16 are each connected to communication devices typically through PHY 10, and the secondary of first and second transformers 16 are each connected to a first end of first and second twisted pair connections 18, respectively. The second end of each of first and second twisted pair connection 18 is connected as a straight through connection through midspan power insertion equipment 34 to the primary of third and fourth transformer 16, respectively, located within powered end station 20. PSE 14 located is within midspan power insertion equipment 34, is connected to third and fourth twisted pair connection 18. The center tap of the primary of third and fourth transformer 16, located within powered end station 20, is connected to PD 22. The second end of third and fourth twisted pair connection 18 is connected to the power input of PD 22. In a preferred embodiment, third and fourth transformers 16 are part of PD 22.

In operation PSE 14 located in midspan power insertion equipment 34 supplies power to PD 22 over third and fourth twisted pair connection 18, with data being supplied from switch/hub equipment 12 over first and second twisted pair connection 18. Power and data are thus supplied over separate connections, and are not supplied over a single twisted pair connection. The center tap connection of third and fourth transformer 16 is not utilized, but is shown connected in order to allow operation alternatively as described above in relation to FIG. 1a.

The above descriptions of configuration and operation are not meant to be limiting in any way. Other configurations similar or equivalent to those presented, including using a midspan PSE 14 to supply both power and data over at least one twisted pair connection, can be used in practice without exceeding the scope of the invention.

Figure 2A:
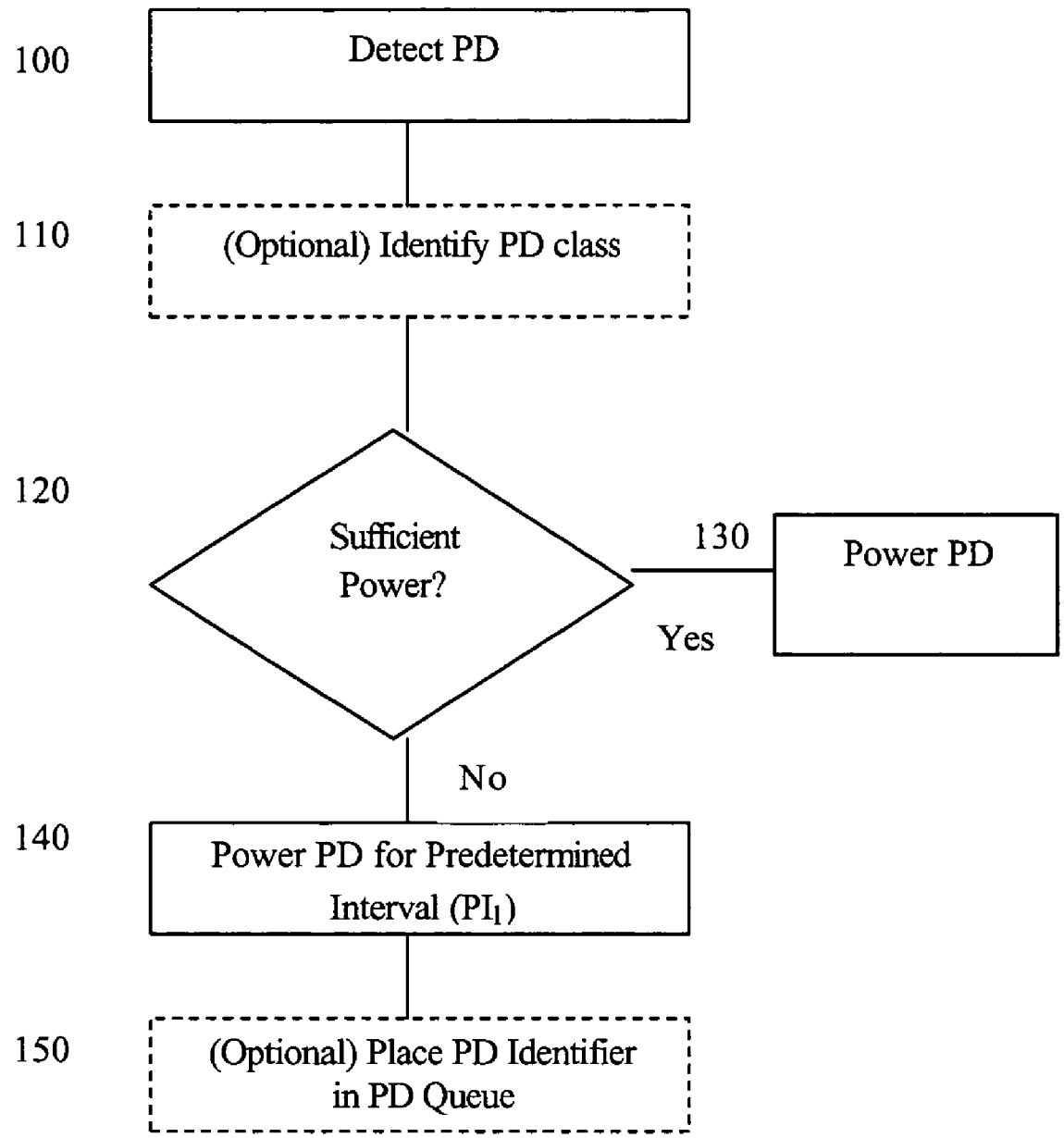
FIG. 2a illustrates a high level flow chart of a first embodiment of the method of notifying according to the principle of the invention.

FIG. 2a illustrates a high level flow chart of a first embodiment of a method of notifying an end user of an excess demand condition according to the principle of the invention. In step 100, PD 22 requiring power is identified in the manner known to those skilled in the art. In optional step 110 the class of PD 22, indicating the power requirements of PD 22, is identified. In particular, 4 classes of power are currently defined in the IEEE 802.3af-2003 standard as shown in Table 1.

TABLE 1

| Class | Minimum Power Levels at Output of PSE |
|---|---|
| 0 | 15.4 Watts |
| 1 | 4.0 Watts |
| 2 | 7.0 Watts |
| 3 | 15.4 Watts |
| 4 | Treat as Class 0 - Reserved for Future Use |

In the event no class data is received from PD 22, step 110 assigns class zero to PD 22. In an alternative embodiment, step 110 is not performed, but instead the power requirements of PD 22 are automatically set to a default. In a preferred embodiment the default is equivalent to class zero.

In step 120, the power availability of PSE 14 is checked to identify if sufficient power is available to power PD 22. If sufficient power is available, in step 130 PSE 14 supplies power to enable PD 22.

If in step 120 an excess demand condition exists and therefore insufficient power is available to power PD 22, in step 140, PSE 14 supplies power to PD 22 for time interval $PI_1$. Powering PD 22 for time interval $PI_1$ acts as an indication to the user of PD 22 that PD 22 is fully functional but insufficient power is available from PSE 14 to power PD 22. In one embodiment time interval $PI_1$ is between 10 seconds and 2 minutes, preferably between 30 seconds and 1 minute. In another embodiment time interval $PI_1$ is a function of the excess demand condition, with a larger excess demand condition translating into a shorter $PI_1$. It is to be understood by those skilled in the art, that the above requires PSE 14 to maintain a power reserve equivalent to the requirements of any PD 22 that will be connected. It is additionally to be understood that multiple PD 22 units can be operated in this manner only if sufficient reserve power is available.

In optional step 150, an identifier for PD 22 is placed in a PD queue. Preferably, the identifier of PD 22 is associated with the class identified in optional step 110. The PD queue thus comprises a list of identifiers of PD 22 units that are not powered due to the excess demand condition. Preferably, the PD queue further comprises a priority identification for each PD 22 unit listed in the PD queue, indicated the priority of the unit for an event in which additional power become available. As indicated above, in one embodiment time interval $PI_1$ is a function of the excess demand condition, thus the greater the sum of the overall power demands of PD 22 units identified in the PD queue, or alternatively the greater the number of PD 22 units identified in the queue, the shorter the time interval $PI_1$.

Figure 2B:
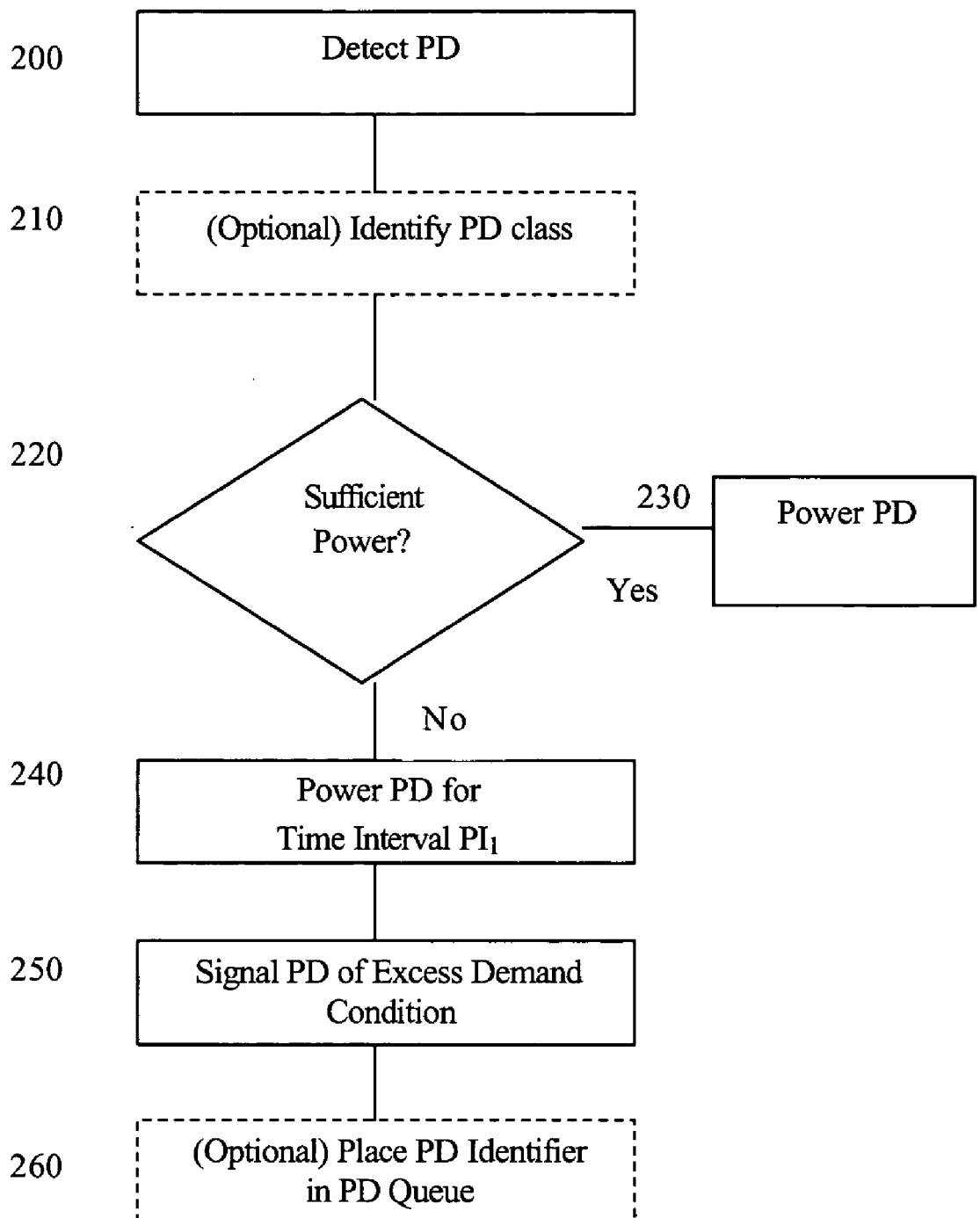
FIG. 2b illustrates a high level flow chart of a second embodiment of the method of notifying according to the principle of the invention.

FIG. 2b illustrates a high level flow chart of a second embodiment of notifying an end user of an excess demand condition according to the principle of the invention, which is similar to the first embodiment described in FIG. 2a, with the addition of signaling PD 22 of the excess demand condition. In step 200, PD 22 requiring power is identified in the manner known to those skilled in the art. In optional step 210, the class of PD 22, indicating the power requirements of PD 22, is identified. In the event no class data is received from PD 22, step 210 assigns class zero to PD 22. In an alternative embodiment, step 210 is not performed, but instead the power requirements of PD 22 are automatically set at a default value. In a preferred embodiment, the default value is equivalent to class zero.

In step 220, the power availability of PSE 14 is checked to identify if sufficient power is available to power PD 22. If sufficient power is available, in step 230 PSE 14 supplies power to enable PD 22.

If in step 220 an excess demand condition exists and therefore insufficient power is available to power PD 22, in step 240 PSE 14 supplies power to PD 22 for time interval $PI_1$. Powering PD 22 for time interval $PI_1$ acts as an indication to the user of PD 22 that PD 22 is fully functional but insufficient power is available from PSE 14 to power PD 22. In one embodiment time interval $PI_1$ is between 10 seconds and 2 minutes, preferably between 30 seconds and 1 minute. In another embodiment time interval $PI_1$ is a function of the excess demand condition, with a larger excess demand condition translating into a shorter $PI_1$. It is to be understood by those skilled in the art, that the above requires PSE 14 to maintain a power reserve equivalent to the requirements of any PD 22 that will be connected. It is additionally to be understood that multiple PD 22 units can be operated in this manner only if sufficient reserve power is available.

In step 250, PSE 14 signals PD 22 that power will only be for a short interval due to the excess demand condition, and optionally PD 22 is configured with a visible or audible warning means thus additionally notifying the end user of the excess demand condition. In an exemplary embodiment, signaling is accomplished over the network to which both PD 22 and PSE 14 are connected using a local area network message. In another embodiment signaling is accomplished in accordance with the teaching of the above mentioned published U.S. patent application Ser. No. US 2003/0072438.

In optional step 260, an identifier for PD 22 is placed in a PD queue. Preferably, the identifier of PD 22 is associated with the class identified in optional step 210. The PD queue thus comprises a list of identifiers of PD 22 units that are not powered due to the excess demand condition. Preferably, the PD queue further comprises a priority identification for each PD 22 unit listed in the PD queue, indicated the priority of the PD 22 unit for an event in which additional power become available. As indicated above, in one embodiment time interval $PI_1$ is a function of the excess demand condition, thus the greater the sum of the overall power demands of PD 22 units identified in the PD queue, the shorter the time interval $PI_1$. In another embodiment time interval $PI_1$ is a function of the number of PD 22 units identified in the PD queue.

The method of FIG. 2a and FIG. 2b are each preferably operable in any number of situations including but not limited to: an initial situation of powering-on of PSE 14, in which the number of attached PD 22 units exceed the power sourcing capabilities of PSE 14, and the priority of PD 22 is too low to be serviced; and an in-operation situation of PSE 14, in which a PD 22 is connected and supplying power to the now connected PD 22 would exceed the power sourcing capabilities of PSE 14, and the priority of PD 22 is too low to be serviced. Furthermore, it is to be understood that the method of FIG. 2a and FIG. 2b is operable for each connection of a PD 22, thus disconnecting and reconnecting a PD 22 will result in the operation of the method of FIGS. 2a or 2b again powering PD 22 for $PI_1$. Furthermore, it is to be understood that the method of each of FIG. 2a and FIG. 2b is preferably operable for each disconnection of a PD 22, which thus makes additional power available for low priority units, or for the connection of a high priority PD 22 unit, which thus forces the disconnection due to excess demand of a low priority PD 22 unit.

Figure 3A:
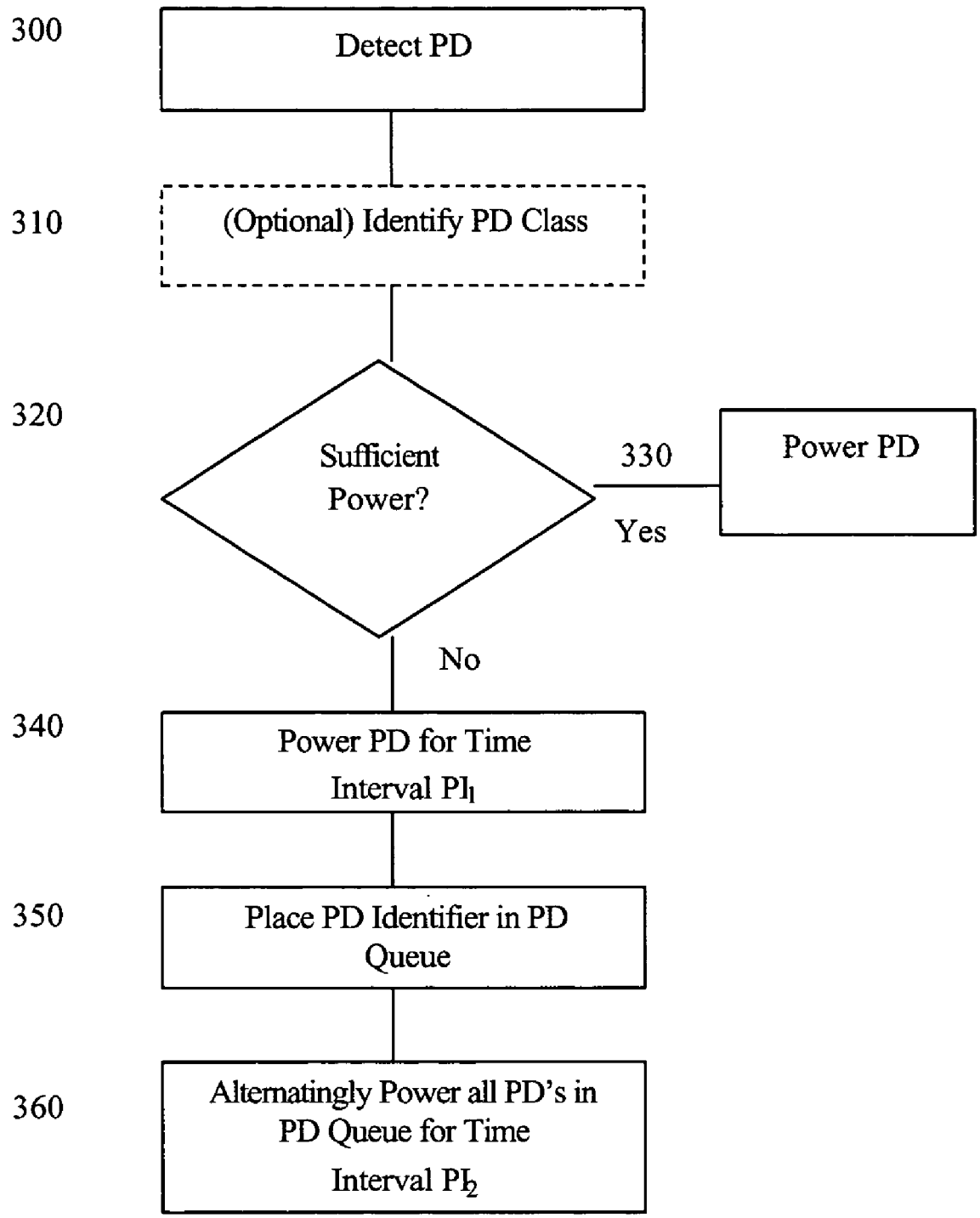
FIG. 3a illustrates a high level flow chart of a third embodiment of the method of notifying according to the principle of the invention.

FIG. 3a illustrates a high level flow chart of a third embodiment of a method of notifying an end user of an excess demand condition according to the principle of the invention, in which after the initial temporary powering, all unpowered PD 22 units are placed in a queue, and alternatively powered for a time interval thus signaling an excess demand condition.

In step 300, PD 22 requiring power is identified in the manner known to those skilled in the art. In optional step 310, the class of PD 22, indicating the power requirements of PD 22, is identified. In the event no class data is received from PD 22, step 310 assigns class zero to PD 22. In an alternative embodiment step 310 is not performed, but instead the power requirements of PD 22 are automatically set to a default. In a preferred embodiment the default is equivalent to class zero.

In step 320, the power availability of PSE 14 is checked to identify if sufficient power is available to power PD 22. If sufficient power is available, in step 330 PSE 14 supplies power to enable PD 22. If in step 320 an excess demand condition exists and therefore insufficient power is available to power PD 22, in step 340 PSE 14 powers PD 22 for a time interval, $PI_1$. Powering PD 22 for time interval $PI_1$ acts as an indication to the user of PD 22 that PD 22 is fully functional but insufficient power is available from PSE 14 to power PD 22. Preferably, time interval $PI_1$ is sufficient to fully power PD 22 and for the user to note proper operation of PD 22 prior to shutdown. In one embodiment time interval $PI_1$ is between 10 seconds and 2 minutes, preferably between 30 seconds and 1 minute. In another embodiment time interval $PI_1$ is a function of the excess demand condition, with a larger excess demand condition translating into a shorter $PI_1$. It is to be understood by those skilled in the art, that the above requires PSE 14 to maintain a power reserve equivalent to the requirements of any PD 22 that will be connected. It is additionally to be understood that multiple PD 22 units can be operated in this manner only if sufficient reserve power is available.

In step 350, an identifier for PD 22 is placed in a PD queue. Preferably, the identifier of PD 22 is associated with the class identified in optional step 310. The PD queue thus comprises a list of identifiers of PD 22 units that are not powered due to the excess demand condition. Preferably, the PD queue further comprises a priority identification for each PD 22 unit listed in the PD queue, indicated the priority of the unit for an event in which additional power become available. As indicated above, in one embodiment time interval $PI_1$ is a function of the excess demand condition, thus the greater the sum of the overall power demands of PD 22 units identified in the PD queue, or alternatively the greater the number of PD 22 units identified in the PD queue, the shorter the interval $PI_1$.

In step 360, PSE 14 powers all unpowered PD 22 units in the PD queue on alternating basis, each PD 22 unit being powered for a time interval $PI_2$. Powering PD 22 for $PI_2$ acts as an indication to the user of PD 22 that PD 22 is fully functional but that an excess demand condition exists, and therefore insufficient power is available from PSE 14 to power PD 22. In one preferred embodiment time interval $PI_2$ is equal to time interval $PI_1$. In another embodiment time interval $PI_2$ is smaller than time interval $PI_1$ and in yet another embodiment time interval $PI_2$ is longer than time interval $PI_1$. Preferably, time interval $PI_2$ is sufficient to fully power PD 22 and for the user to note proper operation of PD 22 prior to shutdown. In one embodiment time interval $PI_2$ is between 10 seconds and 2 minutes, preferably between 30 seconds and 1 minute. In another embodiment time interval $PI_2$ is a function of the excess demand condition, with a larger excess demand condition translating into a shorter $PI_2$. It is to be understood by those skilled in the art, that the above requires PSE 14 to maintain a power reserve equivalent to the requirements of any PD 22 that will be connected.

Figure 3B:
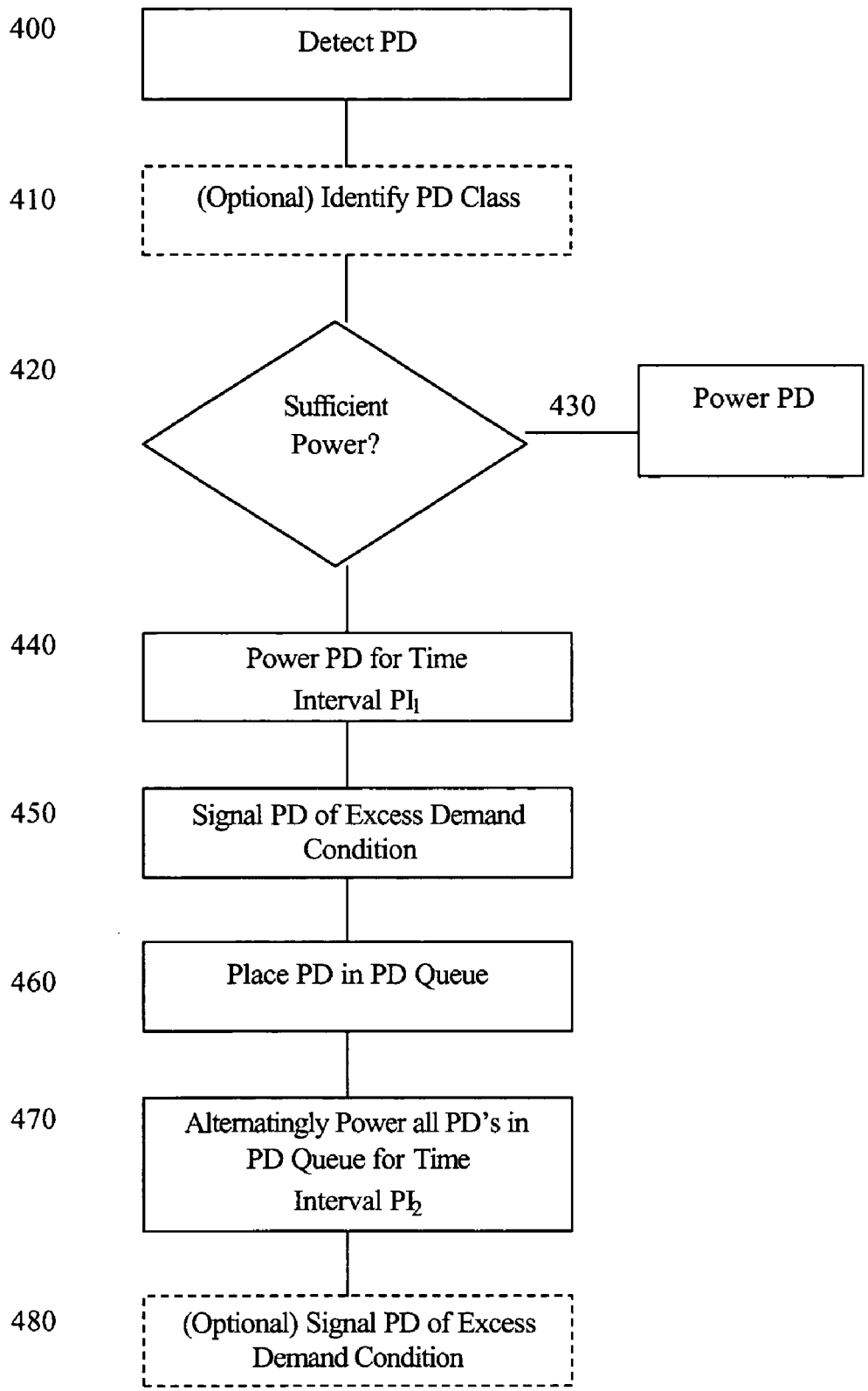
FIG. 3b illustrates a high level flow chart of a fourth embodiment of the method of notifying according to the principle of the invention.

FIG. 3b illustrates a high level flow chart of a fourth embodiment of a method of notifying an end user of an excess demand condition according to the principle of the invention, which is similar to the third embodiment described in FIG. 3a, with the addition of signaling PD 22 of the excess demand condition.

In step 400 PD 22 requiring power is identified in the manner known to those skilled in the art. In optional step 410, the class of PD 22, indicating the power requirements of PD 22, is identified. In the event no class data is received from PD 22, step 410 assigns class zero to PD 22. In an alternative embodiment, step 410 is not performed, but instead the power requirements of PD 22 are automatically set to a default value. In a preferred embodiment the default value is equivalent to class zero. In step 420, the power availability of PSE 14 is checked to identify if sufficient power is available to power PD 22. If sufficient power is available, in step 430 PSE 14 supplies power to enable PD 22.

If in step 420 an excess demand condition exists and therefore insufficient power is available to power PD 22, in step 440 PSE 14 powers PD 22 for a time interval $PI_1$. Powering PD 22 for time interval $PI_1$ acts as an indication to the user of PD 22 that PD 22 is fully functional but insufficient power is available from PSE 14 to power PD 22. Preferably, time interval $PI_1$ is sufficient to fully power PD 22 and for the user to note proper operation of PD 22 prior to shutdown. In one embodiment, time interval $PI_1$ is between 10 seconds and 2 minutes, preferably between 30 seconds and 1 minute. In another embodiment time interval $PI_1$ is a function of the excess demand condition, with a larger excess demand condition translating into a shorter $PI_1$. It is to be understood by those skilled in the art, that the above requires PSE 14 to maintain a power reserve equivalent to the requirements of any PD 22 that will be connected. It is additionally to be understood that multiple PD 22 units can be operated in this manner only if sufficient reserve power is available.

In step 450, PSE 14 signals PD 22 that power will only be for a short time interval due to the excess demand condition, and optionally PD 22 is configured with a visible or audible warning means thus additionally notifying the end user of the excess demand condition. In an exemplary embodiment, signaling is accomplished over the network to which both PD 22 and PSE 14 are connected using a local area network message. In another embodiment signaling is accomplished in accordance with the teaching of the above mentioned published U.S. patent application Ser. No. 2003/0072438.

In step 460, an identifier for PD 22 is placed in a PD queue. Preferably, the identifier of PD 22 is associated with the class identified in optional step 410. The PD queue thus comprises a list of identifiers of PD 22 units that are not powered due to the excess demand condition. Preferably, the PD queue further comprises a priority identification for each PD 22 unit listed in the PD queue, indicated the priority of the unit for an event in which additional power become available. As indicated above, in one embodiment time interval $PI_1$ is a function of the excess demand condition, thus the greater the sum of the overall power demands of PD 22 units identified in the PD queue, or alternatively the greater the number of PD 22 units identified in the PD queue, the shorter the time interval $PI_1$.

In step 470, PSE 14 operatively powers all unpowered PD 22 units in the queue on alternating basis, each PD 22 unit being powered for a time interval $PI_2$. Powering PD 22 for time interval $PI_2$ acts as an indication to the user of PD 22 that PD 22 is fully functional but that an excess demand 20 condition exists, and therefore insufficient power is available from PSE 14 to power PD 22. In one preferred embodiment time interval $PI_2$ is equal to time interval $PI_1$. In another embodiment time interval $PI_2$ is smaller than time interval $PI_1$, and in yet another embodiment time interval $PI_2$ is longer than time interval $PI_1$. Preferably, time interval $PI_2$ is sufficient to fully power PD 22 and for the user to note proper operation of PD 22 prior to shutdown. In one embodiment time interval $PI_2$ is between 10 seconds and 2 minutes, preferably between 30 seconds and 1 minute. In another embodiment time interval $PI_2$ is a function of the excess demand condition, with a larger excess demand condition translating into a shorter $PI_2$. It is to be understood by those skilled in the art, that the above requires PSE 14 to maintain a power reserve equivalent to the requirements of any PD 22 in the queue.

In optional step 480, PSE 14 signals PD 22 that is being alternatingly powered in step 470 that power will only be for a short time interval due to the excess demand condition.

Optionally PD 22 is configured with a visible or audible warning means thus additionally notifying the end user of the excess demand condition. In an exemplary embodiment, signaling is accomplished over the network to which both PD 22 and PSE 14 are connected using a local area network message. In another embodiment signaling is accomplished in accordance with the teaching of the above mentioned published U.S. patent application Ser. No. 2003/00702438.

The methods of FIG. 3a and FIG. 3b are each preferably operable in any number of situations including but not limited to: an initial situation of powering-on of PSE 14, in which the number of PD 22 units exceed the power sourcing capabilities of PSE 14, and the priority of PD 22 is too low to be serviced; and an in-operation situation of PSE 14, in which a PD 22 is connected and supplying power to the now connected PD 22 would exceed the power sourcing capabilities of PSE 14, and the priority of PD 22 is too low to be serviced. Furthermore, it is to be understood that the methods of FIG. 3a and 3b are operable for each connection of a PD 22, thus disconnecting and reconnecting of a PD 22 will result in the operation of the method of FIGS. 3a or 3b again powering PD 22 for $PI_1$, and being placed in the PD queue of unpowered PD 22 units. Furthermore, it is to be understood that the methods of FIG. 3a and FIG. 3b are each preferably operable for each disconnection of a PD 22, which thus makes additional power available for low priority units, or for the connection of a high priority PD 22 unit, which thus forces the disconnection due to excess demand of a low priority PD 22 unit.

FIG. 4 illustrates a high level flow chart of a preferred method of operation when increased power becomes available according to the principle of the invention. Increased power may become available through disconnection of a higher priority PD 22 than any of the PD 22 units identified in the PD queue, or through the addition of additional power resources to PSE 14. In step 500, additional power becomes available. In step 510, the method of FIGS. 2a, 2b, 3a or 3b of a newly connected PD is accomplished for each PD 22 located, in the PD queue. In a preferred embodiment, the method is accomplished in priority order. Preferably, the embodiment chosen to be accomplished for a newly connected PD 22 is accomplished for each PD 22 in the PD queue in the event of additional power.

Figure 5B:
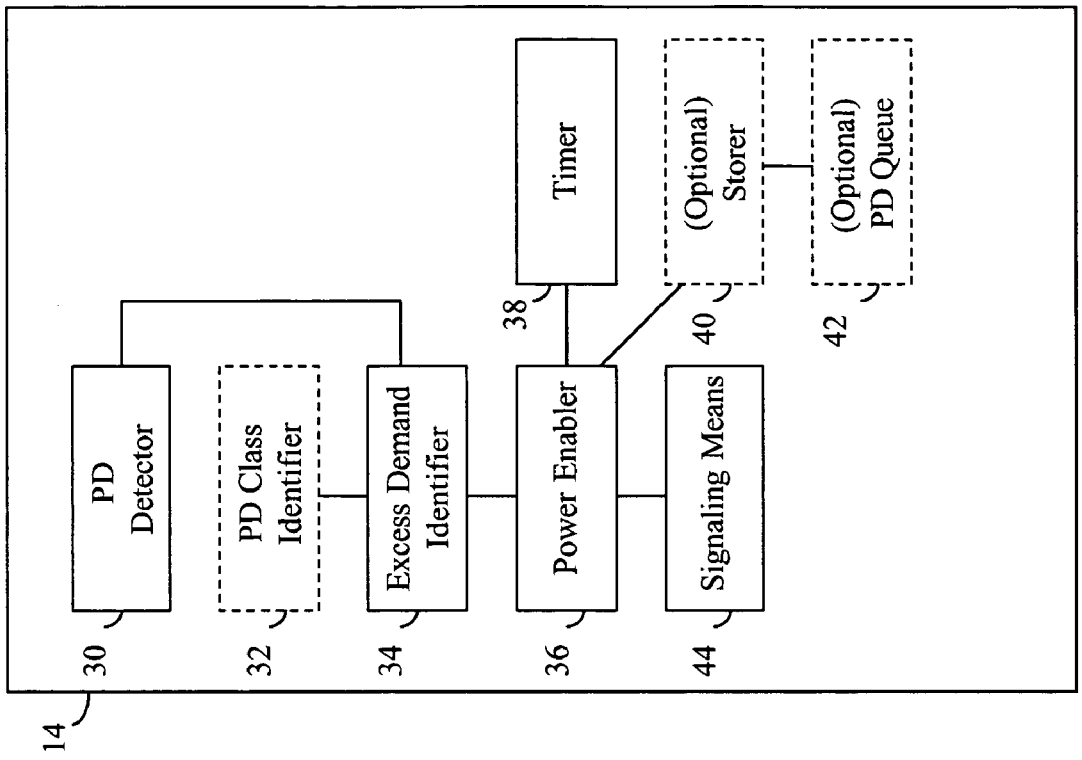
FIG. 5b illustrates a high level functional block diagram of a second embodiment of an apparatus for notifying according to the principle of the invention.
Figure 5A:
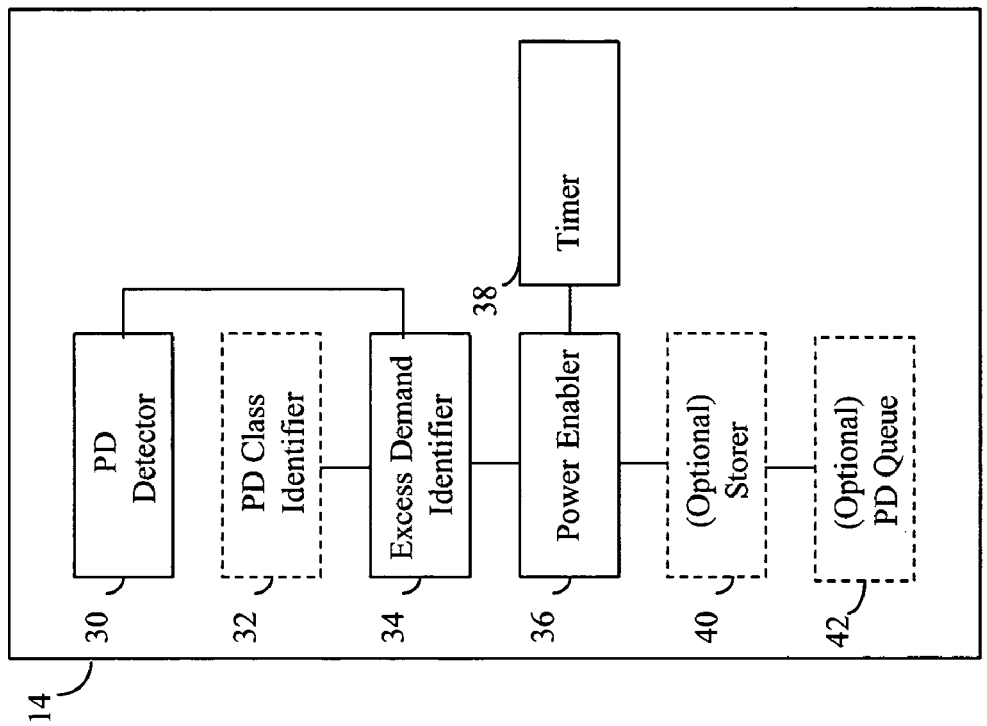
FIG. 5a illustrates a high level functional block diagram of a first embodiment of an apparatus for notifying according to the principle of the invention.

FIG. 5a illustrates a high level functional block diagram of a first embodiment of PSE 14 according to the principle of the invention. The functional block diagram is being described as being embedded within PSE 14, however this is not meant to be limiting in any way. The functional block diagram may be operable by an external control unit connected to PSE 14 or other combination of devices without exceeding the scope of the invention.

PSE 14 comprises PD detector 30, optional PD class identifier 32, excess demand identifier 34, power enabler 36, timer 38, optional storer 40 and optional PD queue 42. PD detector 30 is associated with excess demand identifier 34, and optional PD class identifier 32 is associated with excess demand identifier 34. Excess demand identifier 34 is further associated with power enabler 36. Timer 38 is associated with power enabler 36 and optional storer 40 is associated with optional PD queue 42 and is further associated with power enabler 36.

In operation, PD detector 30 is operable to detect a connected PD 22 unit requiring power. Optional PD class identifier 32 is operable to identity the power requirements of PD 22. In the absence of optional PD class identifier 32, or its unsuccessful operation, excess demand identifier 34 utilizes a default power requirement. Excess demand identifier 34 subsequently checks the availability of power from PSE 14 to identify if sufficient power is available to power PD 22. Power enabler 36 operatively connects power from PSE 14 to PD 22 in the event that sufficient power is available. If an excess demand condition exists and insufficient power is available to power PD 22, power enabler 36 operates in association with timer 38 to power PD 22 for a time interval $PI_1$. Powering PD 22 for time interval $PI_1$ acts as an indication to the user of PD 22 that PD 22 is fully functional but insufficient power is available from PSE 14 to power PD 22. Preferably, time interval $PI_1$ is sufficient to fully power PD 22 and for the user to note proper operation of PD 22 prior to shutdown. In one embodiment time interval $PI_1$ is between 10 seconds and 2 minutes, preferably between 30 seconds and 1 minute. In another embodiment time interval $PI_1$ is a function of the excess demand condition, with a larger excess demand condition translating into a shorter $PI_1$. It is to be understood by those skilled in the art, that the above requires PSE 14 to maintain a power reserve equivalent to the requirements of any PD 22 that will be connected. It is additionally to be understood that multiple PD 22 units can be operated in this manner only if sufficient reserve power is available. Optional storer 40 stores the identification of any unpowered PD 22 units preferably associated with the class identified by optional class identifier 32 in optional PD queue 42.

FIG. 5b illustrates a high level functional block diagram of a second embodiment of PSE 14 according to the principle of the invention. The functional block diagram is being described as being embedded within PSE 14, however this is not meant to be limiting in any way. The functional block diagram may be operable by an external control unit or other combination of devices without exceeding the scope of the invention.

PSE 14 comprises PD detector 30, optional PD class identifier 32, excess demand identifier 34, power enabler 36, timer 38, signaling means 44, optional storer 40 and optional PD queue 42. PD detector 30 is associated with excess demand identifier 34, and optional PD class identifier 32 is associated with excess demand identifier 34. Excess demand identifier 34 is further associated with power enabler 36. Timer 38 is associated with power enabler 36 and signaling means 44 is further associated with power enabler 36. Optional storer 40 is associated with optional PD queue 42 and is further associated with power enabler 36.

In operation, PD detector 30 is operable to detect a PD 22 unit requiring power. Optional PD class identifier 32 is operable to identify the power requirements of PD 22. In the absence of optional PD class identifier 32, or its unsuccessful operation, excess demand identifier 34 utilizes a default power requirement. Excess demand identifier 34 subsequently checks the availability of power from PSE 14 to identify if sufficient power is available to power PD 22. Power enabler 36 operatively connects power from PSE 14 to PD 22 in the event that sufficient power is available. If an excess demand condition exists and therefore insufficient power is available to power PD 22, power enabler 36 operates in association with timer 38 to power PD 22 for a time interval $PI_1$. Powering PD 22 for time interval $PI_1$ acts as an indication to the user of PD 22 that PD 22 is fully functional but insufficient power is available from PSE 14 to power PD 22. Preferably, time interval $PI_1$ is sufficient to fully power PD 22 and for the user to note proper operation of PD 22 prior to shutdown. In one embodiment time interval $PI_1$ is between 10 seconds and 2 minutes, preferably between 30 seconds and 1 minute. In another embodiment time interval $PI_1$ is a function of the excess demand condition, with a larger excess demand condition translating into a shorter $PI_1$. It is to be understood by those skilled in the art, that the above requires PSE 14 to maintain a power reserve equivalent to the requirements of any PD 22 that will be connected. It is additionally to be understood that multiple PD 22 units can be operated in this manner only if sufficient reserve power is available.

Signaling means 44 is operable to signal PD 22 that power will only be for a short interval due to an excess demand condition, and optionally PD 22 is configured with a visible or audible warning means thus additionally notifying the end user of the excess demand condition. In a preferred embodiment, the visible or audible means comprises an LED, a flashing light, a display, a tone or a sequence of tones indicative of an excess power demand condition. In an exemplary embodiment, signaling is accomplished over the network to which both PD 22 and PSE 14 are connected using a local area network message. In another embodiment signaling is accomplished in accordance with the teaching of the above mentioned published U.S. patent application Ser. No. 2003/0072438. Optional storer 40 stores the identification of any unpowered PD 22 units preferably associated with the class identified by optional class identifier 32 in optional PD queue 42.

Figure 5D:
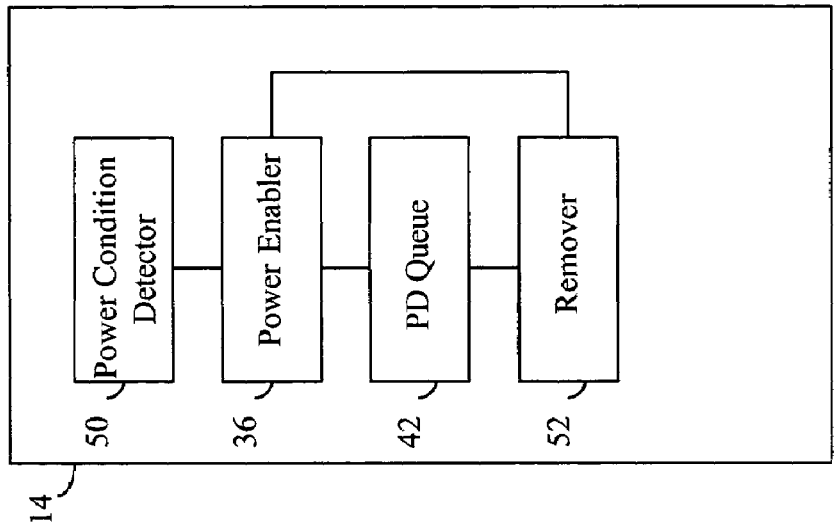
FIG. 5d illustrates a high level functional block diagram of an apparatus according to the principle of the invention.
Figure 5C:
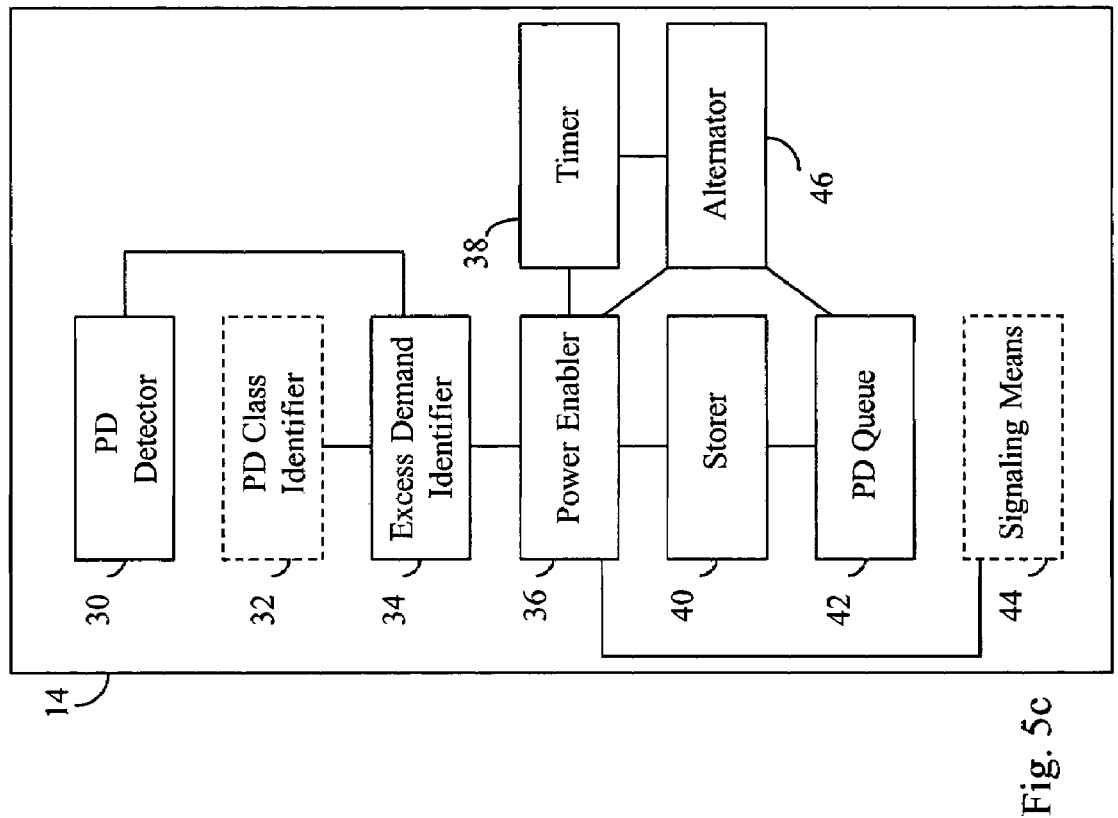
FIG. 5c illustrates a high level functional block diagram of a third embodiment of an apparatus for notifying according to the principle of the invention.

FIG. 5*c* illustrates a high level functional block diagram of a third embodiment of PSE 14 according to the principle of the invention. The functional block diagram is being described as being embedded within PSE 14, however this is not meant to be limiting in any way. The functional block diagram may be operable by an external control unit or other combination of devices without exceeding the scope of the invention.

PSE 14 comprises PD detector 30, optional PD class identifier 32, excess demand identifier 34, power enabler 36, timer 38, storer 40, PD queue 42, alternator 46 and optional signaling means 44. PD detector 30 is associated with excess demand identifier 34, and optional PD class identifier 32 is associated with excess demand identifier 34. Excess demand identifier 34 is further associated with power enabler 36. Timer 38 is associated with power enabler 36. Storer 40 is associated with power enabler 36 and PD queue 42. Alternator 46 is associated with timer 38, PD queue 42 and power enabler 36. Optional signaling means 44 is associated with power enabler 36.

In operation, PD detector 30 is operable to detect a PD 22 unit requiring power. Optional PD class identifier 32 is operable to identify the power requirements of PD 22. In the absence of optional PD class identifier 32, or its unsuccessful operation, excess demand identifier 34 utilizes a default power requirement. Excess demand identifier 34 subsequently checks the availability of power from PSE 14 to identify if sufficient power is available to power PD 22. Power enabler 36 operatively connects power from PSE 14 to PD 22 in the event that sufficient power is available. If an excess demand condition exists and insufficient power is available to power PD 22, power enabler 36 operates in association with timer 38 to power PD 22 for a time interval $PI_1$. Powering PD 22 for time interval $PI_1$ acts as an indication to the user of PD 22 that PD 22 is fully functional but insufficient power is available from PSE 14 to power PD 22. Preferably, time interval $PI_1$ is sufficient to fully power PD 22 and for the user to note proper operation of PD 22 prior to shutdown. In one embodiment time interval $PI_1$ is between 10 seconds and 2 minutes, preferably between 30 seconds and 1 minute. In another embodiment time interval $PI_1$ is a function of the excess demand condition, with a larger excess demand condition translating into a shorter $PI_1$.

It is to be understood by those skilled in the art, that the above requires PSE 14 to maintain a power reserve equivalent to the requirements of any PD 22 that will be connected. It is additionally to be understood that multiple PD 22 units can be operated in this manner only if sufficient reserve power is available.

Optional signaling means 44 associated with power enabler 36 is operable to signal PD 22 that power will only be for a short time interval due to an excess demand condition, and optionally PD 22 is configured with a visible or audible warning means thus additionally notifying the end user of the excess demand condition. In a preferred embodiment, the visible or audible means comprises an LED, a flashing light, a display, a tone or a sequence of tones indicative of an excess power demand condition. In an exemplary embodiment, signaling is accomplished over the network to which both PD 22 and PSE 14 are connected using a local area network message. In another embodiment signaling is accomplished in accordance with the teaching of the above mentioned published U.S. patent application Ser. No. 2003/0072438. Storer 40 stores the identification of any unpowered PD 22 units preferably associated with the class identified by optional class identifier 32 in PD queue 42.

Alternator 46 is operable, in association with PD queue 42 and timer 38, to operate power enabler 36 so as to power all unpowered PD 22 units identified in PD queue 42 on an alternating basis, each PD 22 unit being powered for a time interval $PI_2$ as timed by timer 38. Powering PD 22 for time interval $PI_2$ acts as an indication to the user of PD 22 that PD 22 is fully functional but that an excess demand condition exists, and therefore insufficient power is available from PSE 14 to power PD 22. In one preferred embodiment time interval $PI_2$ is equal to time interval $PI_1$. In another embodiment time interval $PI_2$ is smaller than time interval $PI_1$, and in yet another embodiment time interval $PI_2$ is longer than time interval $PI_1$. Preferably, time interval $PI_2$ is sufficient to fully power PD 22 and for the user to note proper operation of PD 22 prior to shutdown. In one embodiment time interval $PI_2$ is between 10 seconds and 2 minutes, preferably between 30 seconds and 1 minute. In another embodiment time interval $PI_2$ is a function of the excess demand condition, with a larger excess demand condition translating into a shorter $PI_2$. It is to be understood by those skilled in the art, that the above requires PSE 14 to maintain a power reserve equivalent to the requirements of any PD 22 in PD queue 42.

FIG. 5*d* illustrates a high level functional block diagram of an embodiment of PSE 14 illustrating its operation in the event of increased power according to the principle of the invention. PSE 14 comprises power condition detector 50, power enabler 36 associated with power condition detector 50, PD queue 42 associated with power enabler 36 and remover 52 associated with PD queue 42 and power enabler 36.

In operation, in the event that increased power becomes available through disconnection of a higher priority PD 22 than any of the PD 22 units in PD queue 42, or through the addition of additional power resources to PSE 14, the change in power condition is detected by power condition detector 50. Power enabler 36 operates to supply power to additional PD 22 units whose identification is found in PD queue 42. PD units 22 for which power is now available are removed from PD queue 42 by remover 52.

FIG. 6*a* illustrates a high level block diagram of an embodiment of PD 22 unit in accordance with a preferred embodiment of the invention. PD 22 comprises controller 60, memory 62 and display 64. Controller 60 is associated with memory 62 and display 64. In operation, controller 60 detects a power-up condition initiated by PSE 14 and for each power-up condition stores a time marker from the network in memory 62. Memory 62 is a nonvolatile memory or a memory supplied with a battery back-up to achieve non-volatility. Controller 60 is further operable upon power-up to obtain the current time marker from the network and compare it to all previously stored time markers stored in memory 62. In a first preferred embodiment, in the event that the time difference between the current time marker and the previously stored time marker is less than a specified time interval, controller 60 displays a network low power condition message on display 64. In a second preferred embodiment, controller 60 checks memory 62 for the last two stored time markers on memory 62. In the event that the difference between the last two stored time markers on memory 62 are less than a first specified interval, and the time difference between the current time marker obtained from the network and the last stored time marker is less than a second specified time interval, controller 60 displays a network low power condition message on display 64.

FIG. 6b illustrates a high level flow chart of a first embodiment of the operation of controller 60 of PD 22 of FIG. 6a upon power-up. In step 600, controller 60 obtains a current time marker from the network. In step 610, the current time marker obtained in step 600 is stored in memory 62. In step 620, the current time marker is compared with a previously stored time marker obtained from memory 62. In step 630, in the event that the difference between the current time marker and the previously stored time marker is less than a specified time interval, an excess demand condition is displayed on display 64. Preferably the specified time interval takes into account the maximum expected cycle time of the operation of PSE 14 based on the operation as described in connection with FIG. 2a-3b above. In one embodiment the specified time interval is supplied by PSE 14 to controller 60 of PD 22 over the network to which they are both connected. In another embodiment the first time interval is supplied in memory in PD 22.

Figure 6C:
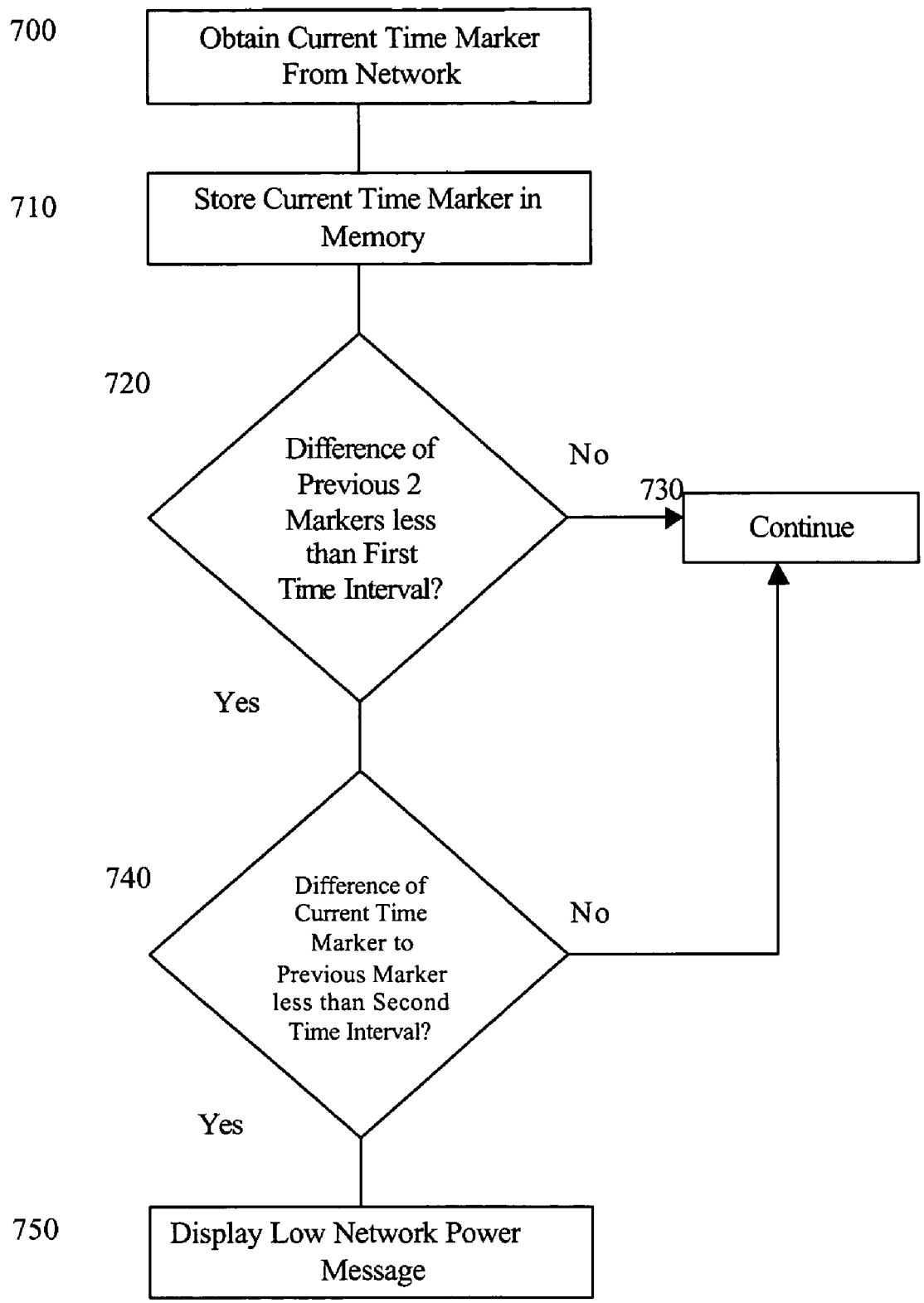
FIG. 6c illustrates a high level flow chart of a second embodiment of the operation of the powered device of FIG. 6a upon power-up according to the principle of the invention.

FIG. 6c illustrates a high level flow chart of a second embodiment of the operation of controller 60 of PD 22 of FIG. 6a upon power-up. In step 700, controller 60 obtains a current time marker from the network. In step 710, the current time marker obtained in step 600 is stored in memory 62. In step 720, the previous 2 time markers stored on memory 62 are obtained and their time difference is compared with a first specified time interval. In the event that the time difference between the previous 2 time markers is greater than the first time interval, in step 730 controller 60 takes no action and continues. Preferably the first specified time interval takes into account the maximum expected cycle time of the operation of PSE 14 based on the operation as described in connection with FIG. 2a-3b above.

In the event that in step 720 the time difference is less than the first time interval, in step 740 the current time marker is compared with the previously stored time marker obtained from memory 62. In the event that the time difference between the current time marker and the previously stored time marker is greater than a second time interval, in step 730 no action is taken. Preferably, the second time interval is the same as the first time period, and is the maximum expected cycle time based on the operation as described in connection with FIG. 2a-3b above. In the event that in step 740 the time difference between the current time marker and the previously stored time marker is less than the second time interval, in step 750 a low network power message is displayed on display 64. In one embodiment the specified first and second time intervals are supplied by PSE 14 to controller 60 of PD 22 over the network to which they are both connected. In another embodiment the first or second time intervals are supplied in memory in PD 22.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

We claim:

1. A method for notifying an end user of a powered device on an Ethernet based network that the powered device will not be powered due to an excess demand condition, the method comprising:

detecting an attached powered device;

identifying an excess demand condition; and temporarily supplying power to said detected attached powered device for a first predetermined time interval responsive to said identified excess demand condition thereby notifying an end user that the powered device is not being powered because of said identified excess demand condition, said supplied power being sufficient to fully power the attached powered device.

2. A method according to claim 1, wherein said powered device is a IEEE 802.3 compliant device.

3. A method according to claim 1, wherein said detecting is accomplished over a connection selected from among 10BaseT, 100BaseT and 1000BaseT.

4. A method according to claim 1, wherein said supplying power is accomplished by one of an Ethernet switch and a Midspan device.

5. A method according to claim 1, further comprising identifying the class of said attached powered device, said class comprising the power requirements of said attached powered device.

6. A method according to claim 5, further comprising storing an identifier of said detected attached powered device associated with said class of said powered device in a queue, said queue comprising an identifier of each of a plurality of attached powered devices each associated with a class, said plurality comprising said stored identifier of said detected attached powered device.

7. A method according to claim 6, wherein said first predetermined time interval is a function of a sum of the power requirements represented by said class associated with said identifiers in said queue.

8. A method according to claim 1, further comprising signaling said attached powered device of said excess demand condition.

9. A method according to claim 8, further comprising displaying on said attached powered device a message indicative of said excess demand condition.

10. A method according to claim 1, further comprising storing an identifier of said detected attached powered device in a queue, said queue comprising an identifier of each of a plurality of attached powered devices, said plurality comprising said stored identifier of said detected attached powered device.

11. A method according to claim 10, further comprising alternatingly temporarily supplying power to each of said plurality of attached powered devices identified by said identifier in said queue for a second predetermined time interval said alternatingly temporarily supplied power being sufficient to fully power said attached powered device identified by said identifier.

12. A method according to claim 11, further comprising signaling each of said plurality of attached powered devices identified by said identifier in said queue of said excess demand condition.

13. A method according to claim 12, further comprising displaying on each of said plurality of attached powered devices a message indicative of said excess demand condition.

14. A method according to claim 11, wherein said second predetermined time interval is substantially the same as said first predetermined time interval.

15. A method according to claim 11, wherein said second predetermined time interval is between 10 seconds and 2 minutes.

16. A method according to claim 10, wherein said first predetermined time interval is a function of the number of said identifiers in said queue.

17. A method according to claim 10, further comprising:
detecting an additional power condition;
powering at least one attached powered device identified by said identifier in said queue; and
removing said identifier of said powered at least one attached powered device from said queue.

18. A method according to claim 17, further comprising:
temporarily supplying power to at least one attached powered device identified by said identifier remaining in said queue for a second predetermined time interval thereby notifying an end user that the powered device is not being powered because of said excess demand condition, said attached powered device being temporarily supplied power for said second predetermined time interval not being said powered at least one attached powered device.

19. A method according to claim 1, wherein said first predetermined time interval is between 10 seconds and 2 minutes.

20. A method according to claim 1, wherein said first predetermined time interval is between 30 seconds and 1 minute.

21. An apparatus for notifying an end user of a powered device on an Ethernet based network of that the powered device will not be powered due to an excess demand condition, the apparatus comprising:
a powered device detector, for detecting an attached powered device connected thereto over communication cabling;
an excess demand identifier associated with said powered device detector, for identifying an excess demand condition;
a timer for timing a first predetermined time interval; and
a power enabler associated with said excess demand identifier and said timer, said power enabler operative to temporarily supply power to said detected attached powered device for said first predetermined time interval responsive to said identified excess demand condition thereby notifying an end user that the powered device will not be powered because of said identified excess demand condition,
said supplied power being sufficient to fully power said detected attached powered device.

22. An apparatus according to claim 21, wherein said attached powered device is a IEEE 802.3 compliant device.

23. An apparatus according to claim 21, wherein said communication cabling is selected from among 10BaseT, 100BaseT and 1000BaseT.

24. An apparatus according to claim 21, wherein said power enabler is located in one of an Ethernet switch and a Midspan device.

25. An apparatus according to claim 21, further comprising a powered device class identifier for identifying the class of said attached powered device, said class comprising the power requirement of said attached powered device.

26. An apparatus according to claim 25 further comprising:
a storer associated with said power enabler; and
a queue associated with said storer,
said storer storing an identifier of said detected attached powered device associated with said class of said attached powered device in said queue, said queue comprising an identifier of each of a plurality of attached powered devices associated with a class, said plurality comprising said stored identifier of said detected attached powered device.

27. An apparatus according to claim 26, wherein said first predetermined time interval is a function of the total power requirements represented by said class of said identifiers in said queue.

28. An apparatus according to claim 21, further comprising signaling means associated with said power enabler for signaling said attached powered device of said identified excess demand condition.

29. An apparatus according to claim 28, further comprising a display connected to said powered device for displaying a message indicative of said excess demand condition.

30. An apparatus according to claim 21 further comprising:
a storer associated with said power enabler; and
a queue associated with said storer,
said storer storing an identifier of said detected attached powered device in said queue, said queue comprising an identifier of each of a plurality of attached powered devices, said plurality comprising said stored identifier of said detected attached powered device.

31. An apparatus according to claim 30, further comprising an alternator associated with said power enabler said timer and said queue, wherein said timer times a second predetermined time interval, and said alternator alternatingly temporarily powers each of said attached powered devices identified by said identifiers of said plurality of attached powered devices in said queue for said second predetermined time interval, said alternatingly temporarily supplied power being sufficient to fully power said detected attached powered device.

32. An apparatus according to claim 31, further comprising signaling means associated with said power enabler for signaling said attached powered device of said identified excess demand condition.

33. An apparatus according to claim 32, further comprising a display associated with said powered device for displaying a message indicative of said excess demand condition.

34. An apparatus according to claim 31, wherein said second predetermined time interval is substantially the same as said first predetermined time interval.

35. An apparatus according to claim 31 wherein said second predetermined time interval is between 10 seconds and 2 minutes.

36. An apparatus according to claim 30, wherein said first predetermined time interval is a function of the number of said identifiers in said queue.

37. An apparatus according to claim 30 further comprising:
   a power condition detector, for detecting an additional power condition; and
   a remover, for removing the identification of at least one attached powered device for which power is now available from said queue.

38. An apparatus according to claim 21, wherein said first time predetermined interval is between 10 seconds and 2 minutes.

39. An apparatus according to claim 21, wherein said first predetermined time interval is between 30 seconds and 1 minute.

40. A powered device adapted to sense an excess demand condition comprising:
   a controller;
   a display associated with said controller; and
   a non-volatile memory associated with said controller, whereby said controller compares a current time marker with a time marker stored on said non-volatile memory, said stored time marker being associated with a powering up event, and in the event the difference between said current time marker and said stored time marker are less than a specified time interval displays a message indicating an excess demand condition on said display.

41. A powered device according to claim 40, wherein said powered device is a IEEE 802.3 compliant device.

42. A powered device according to claim 40, wherein said powered device comprises an Internet Protocol (IP) telephone, an IP camera, a laptop computer or other portable computing device, a desktop computer, a door controller, a cellular base station or a wireless access control.

43. A method for detecting an excess demand condition in a powered device, comprising:
   obtaining a current time marker;
   comparing said current time marker with a previously stored time marker, said previously stored time marker being associated with a powering up of the powered device, thereby obtaining a time difference; and
   displaying an excess demand condition message in the event that said time difference is less than a specified time interval.

44. A method for detecting an excess demand condition in a powered device, comprising:
   obtaining a current time marker;
   retrieving a last two previously stored time markers;
   comparing said last two previously stored time markers to obtain a first time difference;
   comparing the last of said last two previously stored time markers to said current time marker to obtain a second time difference; and
   displaying an excess demand condition message in the event that said first time difference is less than a first specified time interval, and said second time difference is less than a second specified time interval.

* * * * *